Nov. 21, 1950     H. S. JANDUS     2,531,130
BRAKE LEVER STRUCTURE
Filed Feb. 27, 1946     2 Sheets-Sheet 1
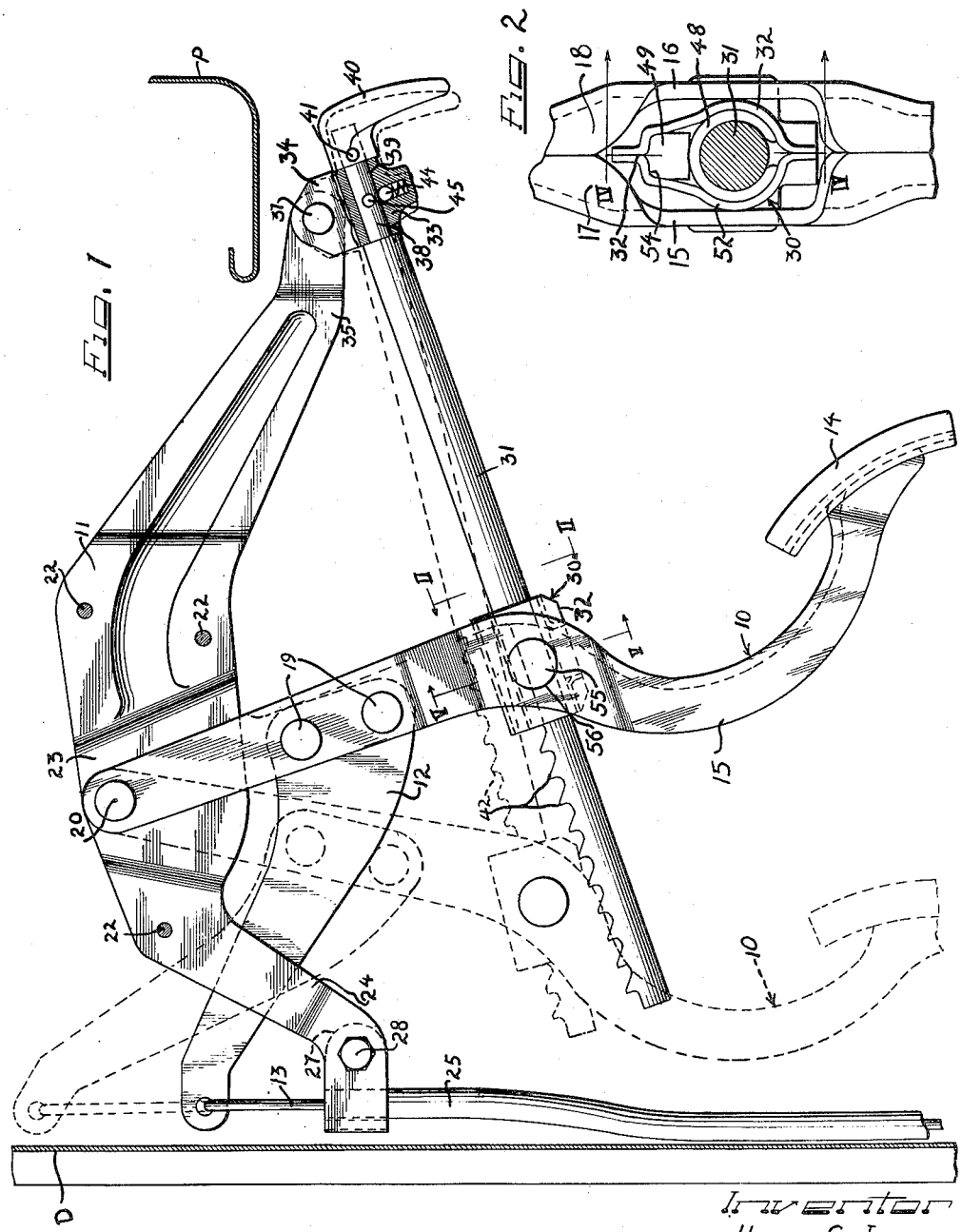
Inventor
HERBERT S. JANDUS

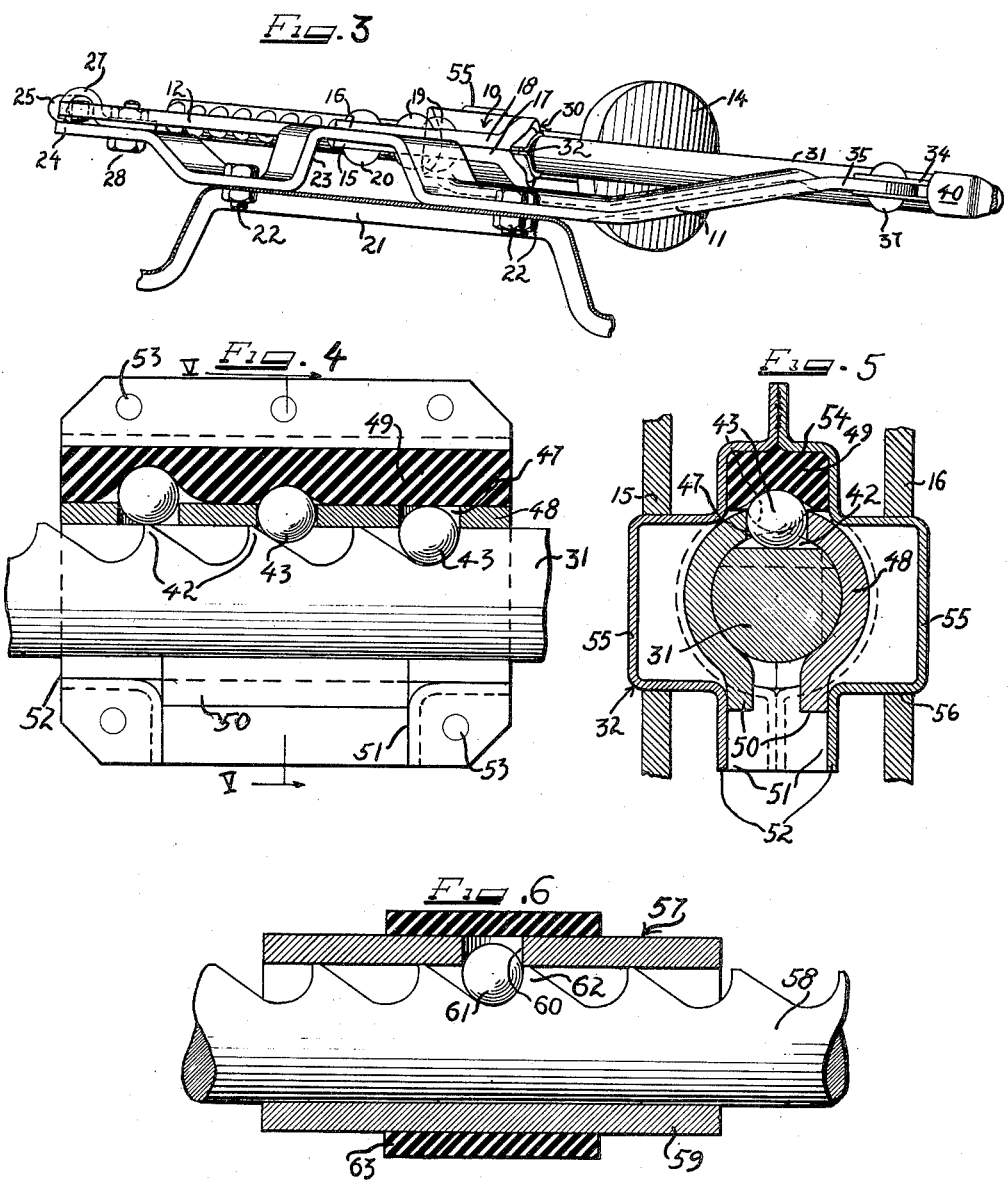

Patented Nov. 21, 1950

2,531,130

UNITED STATES PATENT OFFICE 2,531,130

BRAKE LEVER STRUCTURE

Herbert S. Jandus, Detroit, Mich., assignor to Houdaille-Hershey Corporation, Detroit, Mich., a corporation of Michigan Application February 27, 1946, Serial No. 650,574

17 Claims. (Cl. 74—539)

This invention relates to improvements in brake lever structures, and is more particularly concerned with a novel emergency brake lever structure.

A general characteristic of prior brake levers has been that in operating the lever to set the brake a loud and quite disagreeable rasping noise has resulted from the action of the ratchet mechanism.

In such prior brake lever structures it has been customary to use metallic springs for actuating the pawl or detent elements, and these springs in addition to transmitting ratcheting vibrations and thus being largely contributary to the noisiness referred to, have not been as adaptable nor as efficient as desirable.

Most prior emergency brake lever structures have been confined to hand operation, so that it has been quite inconvenient to use them for emergency use during operation of the vehicle as substitute for the regular foot brake, where the latter becomes disabled for any reason.

An object of the present invention is to provide an improved emergency brake lever structure which is foot operated, has a manual release, and which is provided with a novel quietly and efficiently operating ratchet mechanism.

Another object of the invention is to provide a brake lever structure in which a material on the order of rubber is utilized for maintaining the ratchet detent means under working tension.

Still another object of the invention is to provide in a brake lever structure a new and improved ratchet mechanism wherein the detent means is activated by non-metallic resilient means maintained in a position best suited for maintaining it in optimum useful condition for a prolonged period of service.

Yet another object of the invention is to provide a new and improved emergency brake lever structure which may be optionally used as a parking brake or for emergency braking as a temporary or substitute regular brake.

A still further object of the invention is to provide a simple, efficient foot operated emergency brake structure.

Other objects, features and advantages of the present invention will become readily apparent from the following detailed description of certain preferred embodiments of the invention, taken in conjunction with the accompanying two sheets of drawings, in which:

Figure 1 is a side elevational view of an emergency brake structure embodying the features of the invention, with certain parts shown in section;

Figure 2 is a fragmentary sectional detail view taken substantially in the plane of line II—II of Figure 1;

Figure 3 is a reduced scale top plan view of the emergency brake structure;

Figure 4 is a sectional detail view taken on the line IV—IV of Figure 2;

Figure 5 is a transverse sectional detail view taken in the plane of line V—V of Figure 4; and Figure 6 is a longitudinal sectional view through a modified form of ratchet assembly.

As shown on the drawings:

Brake lever structure embodying the present invention preferably is adapted for foot operation, but it will be obvious that certain features are equally as well adapted for hand operated brake lever structures. In a preferred form, the brake lever structure selected for illustration includes a foot operated lever 10 which is pivotally suspended from a bracket 11 and has a rigid forwardly extending draw arm 12 connected to a take-off or brake setting cable 13. A rearwardly facing foot pedal 14 is carried by the lower end of the brake lever.

By preference, the lever structure 10, 12 and the supporting bracket 11 are formed from sheet metal which can be conveniently and inexpensively fabricated by stamping operations. The lever 10 proper is conveniently constructed of two similarly shaped, complementary sections 15 and 16 (Figs. 2 and 3) which are formed with abutting spacer flanges 17 and 18, respectively, along their front edges. The lever halves 15 and 16 are held assembled by means of securing elements such as rivets 19 which also serve to secure the draw arm 12 between the main lever halves spaced from its upper end to project rearwardly. In addition, the foot pedal 14 is preferably welded to the lever 10 and thereby additionally secures the lever sections 15 and 16 together. At the upper end portion of the lever 10, the spacer and reinforcement flanges 17 and 18 are omitted so that a clevis is provided to receive the bracket 11 therein. Means such as a rivet 20 pivotally secures the clevis portion to the bracket for forward and rearward swinging movement of the brake lever 10. Any convenient support may be utilized for the bracket 11, such as a portion 21 (Figure 3) of the vehicle in which the brake lever structure is used, and to which the bracket may be secured removably as by means of bolts 22. In order to afford clearance between the brake lever and the supporting structure 21, the bracket may be intermediately off-set as indicated at 23. The lever structure may be disposed conveniently under the instrument panel P and adjacent the dash board D.

Extending forwardly on the bracket 11 is an integral arm 24 which is adapted to provide a support for a protecting and guiding conduit 25 housing the cable 13. A removable clamp 27 cooperates with the arm 24 to secure the adjacent end of the conduit 25 and is fastened by means such as a bolt 28.

For holding the brake lever 10 in brake-setting position, ratchet mechanism 30 is provided which comprises a ratchet rod 31 and cooperating detent structure carried by a housing 32 mounted on the lever 10. The ratchet rod 31 is preferably supported in a manner to permit swinging thereof in the plane of the brake lever 10 in order to adjust itself to the arc of movement of the brake lever, but is held against axial movement. Means for this purpose comprises a hanger 33 having a clevis 34 by which the hanger is pivotally secured to the rearward end of a supporting arm 35 projecting integrally from the bracket 11. Means such as a rivet-headed pin 37 provides a pivotal connection between the clevis 34 and the arm 35. The outer end of the ratchet rod 31 is formed with a reduced diameter portion 38 extending slidably through a bore 39 provided therefor in the hanger 33, and a handle 40 secured as by means of a pin 41 to the outer extremity of the reduced diameter portion 38 secures the ratchet rod against longitudinal separation from the hanger but permits free relative rotation. Since the reduced diameter ratchet rod portion 38 is rotatably supported, the ratchet rod 31 can be rotated by means of the handle 40 to effect disengagement of ratchet teeth 42 (Fig. 4 and 5) from detent members 43 when it is desired to release the brake lever 10 from set or brake-locking position. A detent 44 carried by the hanger 33 and engageable in a detent or interlock socket 45 in the reduced diameter portion of the ratchet rod is adapted to hold the ratchet rod 31 in the release position where it is desired to use the brake lever 10 as emergency substitute for the regular brake pedal should the regular brake system or brake lever be out of service for any reason.

According to the present invention, the detent elements 43 are preferably in the form of balls which are radially movable in respective guide apertures 47 in a retainer sleeve 48 which engages the ratchet rod 31 slidably and may be ruggedly constructed from metal. The detents 43 are held in or urged toward operative position by resilient means of preferably non-metallic character such as rubber or any rubber-like material in the form of a block 49 (Figures 4 and 5) which is held under compression in association with the sleeve 48 and overlying the guide apertures 47. In a preferred construction for this purpose, the retainer sleeve 48 is interlockingly assembled with the housing 32, and the housing is pivotally assembled on a fixed axis with the brake lever 10. To this end, the retainer sleeve 48 is formed intermediate its ends with laterally projecting longitudinal interlock ears 50 which may be formed by a longitudinal split in the sleeve opposite the guide apertures 47 with portions of the sleeve bordering the slit bent into the ear form shown. These ears are interlockingly engaged within off-set sockets 51 provided therefor in identical sheet metal shells 52 which are complementally shaped and flanged and secured together as by means of spot welding 53 to provide the housing 32. A pocket or chamber 54 extending longitudinally on the opposite side of the housing from the sockets 51 is dimensioned to receive and maintain the resilient block 49 under at least slight compression which condition is, of course, quite desirable to prolong the liveness or resilience of rubber. Respective integral trunnions 55 (Figs. 1 and 5) projecting coaxially in opposite directions from the housing shells engage in respective bearing apertures 56 in the lever halves 15 and 16 and thus maintain the housing 32 assembled with the lever and rotatable in its plane to accommodate angular adjustment of the ratchet rod 31 as the lever 10 swings and the retainer sleeve 48 slides along the rod.

To afford relatively fine incremental setting adjustment of the lever 10 and yet have the ratchet teeth large and rugged, a plurality of detent balls 43 is used which are so relatively spaced that only one is active at a time and another becomes active upon only slight predetermined incremental relative adjustment of the ratchet housing 32 by swing of the lever 10 longitudinally forwardly along the ratchet rod 31.

As each of the detent balls 43 cams over a ratchet tooth 42, it is urged radially outwardly through its retaining sleeve guide aperture 47 and drives compressingly into the resilient block 49 (Fig. 4). This places the engaged area of the block 49 under increasing compression, and thereby load or reactive resilient tension as the respective detent ball is driven toward the limit of projection from the retaining sleeve 48. As each of the detent balls 43 rides over the apex of a tooth in the setting of the brake lever 10, the ball is snapped into operative engagement with the ratchet side of the tooth. This snapping action, of course, tends to set up a certain amount of vibration in the particular detent ball 43 and in the ratchet rod 31 which to a certain extent, at least, is also transmitted to the retaining sleeve 48 and the housing 32. However, since, the resilient detent actuating block 49 is in contact with the detent ball and also with the retaining sleeve 48 and the housing shells 52, it effectually dampens the vibrations with the result that a minimum of sound is created which may be heard as an inconspicuous reassuring click, without the clatter and rasping noise customarily attendant upon the operation of a ratchet mechanism involving the use of springs for the detents.

As shown in Figure 1, the brake lever 10 may be moved from the full line position forwardly to the broken line position in setting the lever. This causes the detent housing 32 to move forwardly along the rod 313, and the ratchet mechanism 30 will hold the lever in this position until the handle 40 is manually actuated to turn the ratchet rod 31 to release the ratchet teeth 42 from the detent balls 43. Such release permits the brake lever 10 to return to the non-braking position, as will be caused by the braking tension on the cable 13.

Should it be desired to permit free swinging of the brake lever 10 so that it can be used as an emergency substitute or temporary brake instead of the regular brake of the vehicle, the ratchet rod 31 may be left in the non-ratcheting position where it will be held by the detent 44, in the manner previously described.

For some purposes it may be desired to have a less elaborate ratchet mechanism than the mechanism 30, and in such case a modified form of ratchet mechanism 57, as shown in Figure 6, may be employed. The latter comprises a ratchet rod 58 longitudinally slidable through a retaining sleeve 59 which has at least one guide aperture 60 opening radially therefrom for a detent ball 61 which is operatively engageable with detent teeth 62. To render the teeth 62 yieldably operative, a sleeve 63 of rubber or rubber-like material is disposed in snug encircling relation about the retaining sleeve 59 operatively disposed over the guide aperture 60. Thus, as the detent ball 61 is cammed through the guide aperture 60, it engages the resilient sleeve 63 which reacts thereagainst to urge it resiliently toward the ratchet.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in a brake lever structure, a foot operated lever having means for operatively connecting it to a setting or take-off cable, and ratchet mechanism for holding the lever in set or brake-locking condition including a non-axially movable but swingably mounted elongated ratchet member and detent means carried by the lever cooperating with the ratchet member, said ratchet member being manually operable to release it from the detent means.

2. In combination in a brake lever structure of the character described, a supporting bracket, a foot operated brake lever swingably suspended from said bracket, a draw arm carried by said lever and adapted to be connected to a brake-setting cable, ratchet mechanism for securing the brake lever in set position including an elongated ratchet member supported in axially fixed but swingable relation by said bracket, and detent means cooperative with the ratchet member and carried by the brake lever.

3. In combination in a brake lever structure, a supporting bracket, a brake setting cable, a conduit for guiding said cable supported by said bracket, a brake lever swingably suspended from said bracket and carrying a foot pedal at its lower extremity, a draw arm extending forwardly from said brake lever and having said cable secured thereto, a ratchet member carried by said bracket, and detent means carried by said brake lever and cooperating with said ratchet member.

4. In combination in a brake lever structure, a sheet metal brake lever comprising a pair of elongated members cooperatively related in spaced side-by-side relation, a cable-draw arm projecting from between said members, means securing said brake members together and said arm in place between the members, a foot pedal carried by said lever and further connecting said members together, and ratchet mechanism extending between and in part carried by said lever members.

5. In combination in a brake lever structure, a sheet metal brake lever comprising a pair of elongated members cooperatively related in spaced side-by-side relation, a cable-draw arm projecting forwardly from between said members, means securing said brake members together and said arm in place between the members, a foot pedal carried by said lever and further connecting said members together, and ratchet mechanism extending between and in part carried by said lever members, said ratchet mechanism comprising a detent housing pivotally supported by the lever members and a ratchet rod extending slidably through said housing and projecting rearwardly from the lever for releasing manipulation.

6. In combination in a brake lever structure, a supporting bracket, a foot operated brake lever swingably suspended from said bracket, means for attaching a setting cable to said brake lever, detent means carried by the lever, a ratchet rod cooperating with said detent means and projecting rearwardly from the lever, and a hanger supported by said bracket and swingably supporting the ratchet rod in relatively fixed axial relation thereto.

7. In combination in a brake lever structure, a supporting bracket, a foot operated brake lever swingably suspended from said bracket, means for attaching a setting cable to said brake lever, detent mechanism carried by the lever and a ratchet rod cooperating with said detent mechanism and projecting rearwardly from the lever, and a hanger supported by said bracket swingably and relatively rotatably supporting the ratchet rod, said hanger and said ratchet rod having cooperating detent means for holding the ratchet rod selectively in non-operating rotary position.

8. In a brake lever structure, ratchet mechanism including a ratchet member, a sleeve slidably engaging said member and having a plurality of guide apertures therein disposed in a row longitudinally of the sleeve, a respective ball detent supported within each of said guide apertures in cooperation with the ratchet member, a housing enclosing said sleeve and secured against relative movement, said housing having means providing a chamber outwardly from said guide apertures, and resilient means comprising rubber-like material housed within said chamber and acting upon said ball detents to maintain yielding pressure thereon toward said ratchet member.

9. In a structure of the character described, ratchet mechanism including a ratchet member, a sleeve slidably engaging said member and having a guide aperture therein, a ball detent supported within said guide aperture in cooperation with the ratchet member, a housing enclosing said sleeve and interlocked therewith against relative movement, said housing having means providing a chamber outwardly from said guide aperture, and resilient means maintained under compression within said chamber and acting upon said ball detent, said housing having integral trunnions extending coaxially in opposite directions therefrom for pivotal cooperation with a brake lever.

10. In combination in ratchet mechanism for a brake lever structure or the like, an elongated ratchet member, a detent element cooperative with the ratchet member, means for retaining the detent element, a housing enclosing the detent element and the retaining means including a chamber affording operative clearance for the detent element, and a block of rubber-like material maintained under compression within said chamber and reacting against said detent element to drive it into operative relation to the ratchet member.

11. In combination in ratchet mechanism of the character described, an elongated ratchet member, a relatively rigid retainer sleeve slidably disposed about said ratchet member and having a guide aperture therethrough, a detent member operatively disposed in said guide aperture and movable therethrough, and a sleeve of rubber-like material encircling said retainer sleeve and opposing said detent element.

12. In combination in a ratchet mechanism of the character described, an elongated ratchet element, a retainer sleeve about said ratchet element and adapted for relative sliding movement along the ratchet element, a detent element retained operatively with respect to the ratchet member by said retainer sleeve, a housing enclosing said retainer sleeve, and a mass of rubber-like resilient material maintained under compression in operative opposition to said detent.

13. In combination in ratchet mechanism of the character described, a ratchet rod, a retainer sleeve relatively slidably disposed about said ratchet rod and having interlock ears projecting therefrom, a housing comprising a pair of sheet metal shells about said retainer sleeve and interlockingly engaging said interlock ears, guide apertures in said sleeve, a detent within said aperture and cooperatively related to the ratchet rod, and a mass of non-metallic resilient material carried by the housing and operatively engaging said detent for urging the same toward the ratchet rod.

14. In combination in a ratchet mechanism of the character described, a ratchet rod having ratchet teeth along one side thereof, a retainer sleeve encircling the rod slidably and having an aperture opening radially therefrom, a detent disposed in said aperture and cooperative with the ratchet teeth, a housing about said retainer sleeve and providing a chamber opposite said aperture, and a mass of rubber-like material in said chamber opposing said detent and urging it resiliently toward said ratchet teeth through said aperture, said rod being rotatable in said sleeve for clearing said ratchet teeth by driving the detent into said mass of opposing material to permit free relative longitudinal sliding of the ratchet rod and sleeve.

15. In combination in a ratchet mechanism of the character described, a ratchet element, a detent, a retainer for the detent, rubber-like resilient material cooperative with the retainer and opposing said detent, and means for maintaining the rubber-like material constantly under compression.

16. In a ratchet mechanism of the character described, a ratchet member, a retainer, a detent held in operative relation to the ratchet member by the retainer, a housing about the retainer, and combined detent tensioning and sound dampening means supported by the housing in operative relation to the retainer and detent.

17. In combination in a structure of the character described, a cylindrical longitudinally reciprocable and rotatable ratchet rod, a tubular guide member within which said rod is reciprocably and rotatably slidable, said guide member having a circular hole therethrough, a ball detent movable through said hole and being held by the wall defining said hole against longitudinal or lateral displacement, said ratchet member having a series of ratchet teeth formed to receive said detent ball successively for effecting with the detent ball and the detent hole wall a solid interlock against movement in one longitudinal direction but effective in the opposite longitudinal direction to displace the ball through said hole radially outwardly to clear successive teeth, and rubber-like means engaging said tubular member and blocking the exit side of said hole, said tubular member being thinner in the area about said hole than the diameter of said detent ball so that when the ball is displaced outwardly through said hole it engages said rubber-like member and places the latter under tension to urge the ball into ratcheting relation with said teeth, said rod being rotatable to urge said ball outwardly in said hole and clear of the ratchet teeth whereby the ball will ride freely along a tooth-free longitudinal area of the ratchet member for returning the ratchet member in said one direction.

HERBERT S. JANDUS.

REFERENCES CITED

The following references are of record in the file of this patent:

UNITED STATES PATENTS

| Number | Name | Date |
|---|---|---|
| 344,363 | Emenhiser | June 29, 1886 |
| 1,500,305 | Fekete et al. | July 8, 1924 |
| 1,657,738 | Booth | Jan. 31, 1928 |
| 1,718,258 | Schmidt | June 25, 1929 |
| 1,866,244 | White | July 5, 1932 |
| 1,911,540 | Weatherhead, Jr. | May 30, 1933 |
| 1,986,232 | Weatherhead, Jr. | Jan. 1, 1935 |
| 2,132,919 | Arens | Oct. 11, 1938 |
| 2,180,307 | Lucker | Nov. 14, 1939 |
| 2,304,356 | Heller | Dec. 8, 1942 |
| 2,308,898 | Skareen | Jan. 19, 1943 |
| 2,309,734 | Klotsch | Feb. 2, 1943 |
| 2,315,962 | Jandus | Apr. 6, 1943 |
| 2,329,182 | Boynton | Sept. 14, 1943 |